United States Patent [19]

Schobl

[11] 4,394,872

[45] Jul. 26, 1983

[54] VALVE ASSEMBLY FOR PACKING REMOVAL

[75] Inventor: Howard T. Schobl, Coraopolis, Pa.

[73] Assignee: Schobl Enterprises, Inc., Imperial, Pa.

[21] Appl. No.: 222,535

[22] Filed: Jan. 5, 1981

[51] Int. Cl.³ .................. F16K 41/02; F16K 41/14
[52] U.S. Cl. ................................. 137/315; 251/214; 251/330; 277/9
[58] Field of Search .................... 251/214, 330; 277/9; 137/315

[56] References Cited

U.S. PATENT DOCUMENTS

| | | | |
|---|---|---|---|
| 2,809,059 | 10/1957 | Hillis | 277/9 |
| 3,147,950 | 9/1964 | Milleville | 251/214 |
| 3,237,917 | 3/1966 | Kunzer et al. | 251/214 |
| 3,851,853 | 12/1974 | Teeters | 251/214 |

FOREIGN PATENT DOCUMENTS 726300 3/1955 United Kingdom ................ 251/214

*Primary Examiner*—Arnold Rosenthal
*Attorney, Agent, or Firm*—Lawrence G. Zurawsky

[57] ABSTRACT

A valve assembly for packing removal includes a valve body having a bonnet and yoke attached to the body and a chamber extending longitudinally through the bonnet. A stem secured in the yoke extends through the bonnet chamber. Valve packing means are enclosed in the bonnet around the stem and secured by a packing gland connected to the top of the bonnet. An annular drive bushing is mounted in the bonnet chamber around the stem below the bottom of the packing means. In actuation of the drive bushing, mechanical or fluid drive means engage the bottom of the drive bushing, with the packing gland removed from the bonnet, to displace the drive bushing upwardly through the bonnet chamber for removal of the packing means therefrom.

8 Claims, 4 Drawing Figures

VALVE ASSEMBLY FOR PACKING REMOVAL

BACKGROUND OF THE INVENTION

1. Field of the Invention

This invention relates to valve apparatus having self-contained means to remove the valve packing, and more particularly to valve apparatus having a drive bushing mounted in the valve bonnet and adapted to be driven by mechanical or fluid means upwardly through the bonnet to displace the valve packing.

2. Description of the Prior Art

In the maintenance of valves, the removal and replacement of packing materials from around the valve stem in the valve bonnet previously has been a difficult, time consuming, and expensive task. Because the valve packing becomes compressed, hardened, congealed and brittle in use, removal of the packing generally required removal from service and disassembly of the valve apparatus, which is expensive and time consuming. In addition, removal of the packing material itself generally requires the use of sharp instruments such as hooks, picks, corkscrews, screwdrivers, scrapers, wire brushes and like implements that are likely to damage the highly ground or polished interior surfaces of the valve body. Damage to those surfaces results in a high failure rate of valve packing and intolerable fluid leaks arising from the loss of the static seal between the packing and the stem or between the packing and the interior surfaces of the stem and bonnet. Such damage often requires replacement of the entire valve assembly.

Various types of valve apparatus have been suggested for packing removal. U.S. Pat. No. 2,809,059 describes such a device having an annular abutment element mounted in the bonnet chamber adjacent the bottom of the packing material. The abutment element has a transverse internally threaded bore hole through the side of the abutment element which must be aligned with a bore hole in the valve stem and with a threaded bore hole through the side wall of the bonnet. During conventional use of the valve, a threaded Allen screw is positioned through the bore hole in the bonnet wall and partially through the bore hole through the abutment element to lock the abutment element in place and prevent its movement when the valve stem is rotated. When it is desired to remove the packing, the bore hole in the stem must be aligned with the bore hole through the abutment element and the Allen screw must be inserted through the abutment element bore hole into the bore hole in the stem and beyond the interior surface of the valve bonnet chamber. The difficulty and disadvantage with that apparatus arises from the difficulty involved in achieving proper alignment of the bore holes between the valve stem and the abutment element and between the abutment element and the valve bonnet, in particular in view of the necessity of accounting for the vertical displacement of the valve stem imparted by the pitch of the threads on the valve stem upon its rotation. That operation becomes even more difficult as the valve seating surfaces wear and the vertical position of valve stem elements changes with valve use.

U.S. Pat. No. 3,237,917 describes a valve assembly in which the packing is supported in the stuffing box by an intermediate bushing which rests on a lower bushing. The lower end of the valve stem has a cylindrical shoulder which could engage the lower bushing if the valve stem could be raised a sufficient distance. That operation is not possible with the structure shown in that patent because upward motion of the valve stem is restricted by several elements of structure. The packing gland is locked in threaded engagement with the upper end of the valve body to permit independent rotation of the upper stem which threadably engages the interior surface of the packing gland. If the stem were rotated upwardly with the packing gland locked in place, the bushings and the packing material could not be displaced. On the other hand, removal of the packing gland introduces several problems. The packing gland can not be unscrewed from the upper portion of the valve body until after the valve stem handle and the bonnet are separately removed and the gland lock nut is loosened. In that condition, the packing gland can not be rotated outward simultaneously with the threaded stem because the compressed and hardened packing material will bind the stem and retain it within the valve body while the packing gland is rotated upwardly off the stem. If the packing gland is totally removed, the threaded stem will ride freely in the upper portion of the valve body and will not move upwardly upon rotation of the stem because of the loss of the stem's threaded connection to the packing gland which has been removed. With the packing gland removed, if the stem is forceably jerked from the valve body to remove the packing, there is substantial danger of damaging the interior surfaces of the upper valve body and stuffing box and the stem threads.

There remains a need for a simply constructed valve assembly apparatus having self-contained drive means for displacement of the packing means, which drive means can be readily and simply actuated by mechanical or fluid pressure means.

SUMMARY OF THE INVENTION

In accordance with the present invention there is provided a valve apparatus that includes a bonnet with a chamber extending through said bonnet, a yoke, and a valve stem extending through said yoke and bonnet chamber. A packing gland is detachably mounted on the bonnet around the stem with a lower portion of the gland extending into the bonnet chamber. Packing means are mounted within the chamber around the stem below the packing gland. Packing drive means, mounted within the chamber around the stem below the packing means, are adapted to engage a bottom portion of the packing means to displace the packing means from the bonnet upon the application to the bottom of the drive means of an upwardly directed force.

In a preferred embodiment of the apparatus of this invention limit means carried on the stem are secured at a position adapted to prevent further outward movement of the stem past a preselected point.

Accordingly, it is an object of the present invention to provide valve apparatus having self-contained means for removal of the valve packing.

It is another object of the present invention to provide valve apparatus having self-contained means for removal of the valve packing that can be actuated mechanically by rotation of the valve stem.

A further object of the present invention is to provide back-seating valve apparatus having self-contained packing removal means that can be actuated by fluid pressure.

Another object of the present invention is to provide valve apparatus having self-contained packing removal means that can be actuated without substantial damage to the surfaces of the stem and valve bonnet.

Still another object of the present invention is to provide valve apparatus having self-contained packing removal means that can be actuated and employed with less expense and less loss of time than was possible with other, prior art valve assemblies.

Those and other objects of the present invention will be more completely disclosed and described in the following specification, the accompanying drawings and the appended claims.

DESCRIPTION OF THE PREFERRED EMBODIMENTS

Figure 2:
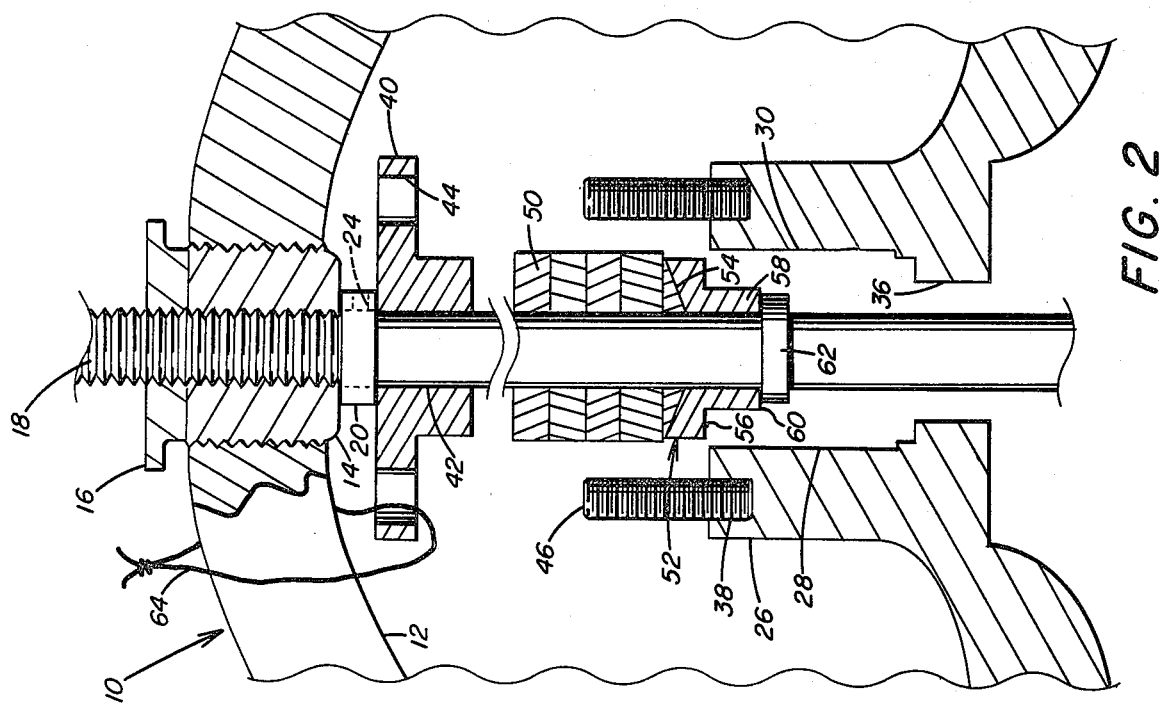
FIG. 2 is a slide elevation view of a valve incorporating the packing removal assembly of this invention, with portions shown in cross-section for clarity, showing the assembly with the valve packing removed from the bonnet.
Figure 1:
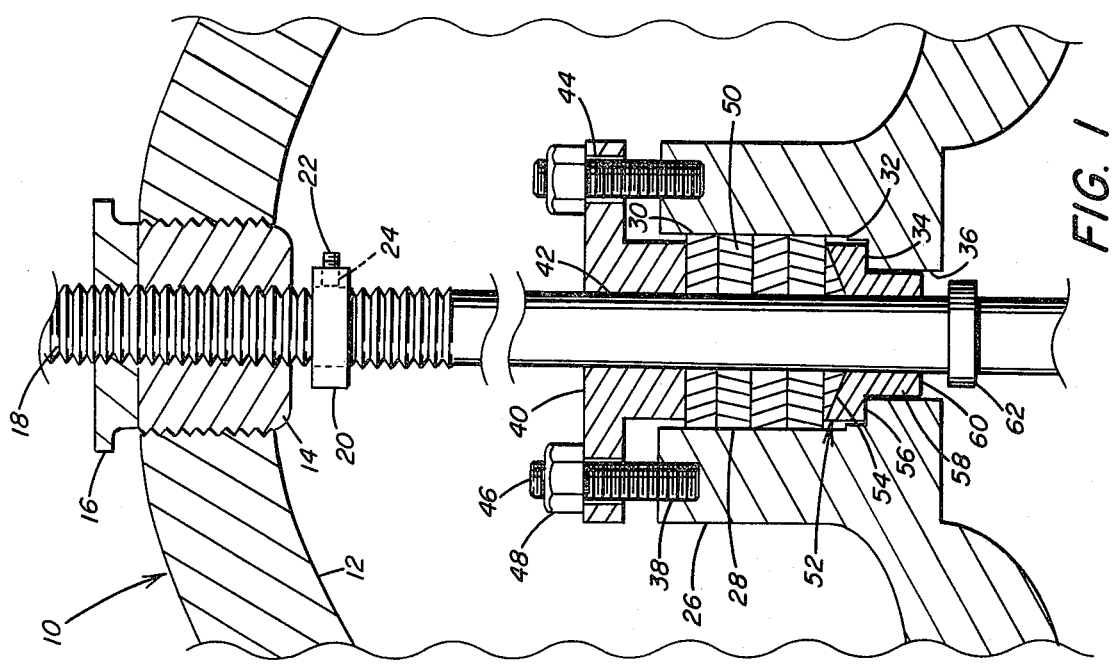
FIG. 1 is a slide elevation view of a valve incorporating the packing removal assembly of the subject invention, with portions of said view shown in cross-section for clarity.

Referring to the drawings, and particularly to FIGS. 1 and 2, a valve, indicated generally by reference numeral 10, has a yoke 12 and a threaded stem bushing 14 secured within yoke 12. A valve stem 18, having threads on the upper portion thereof, extends through the bushing 14 and a valve bonnet 26 into the valve body. An upset hexagonal nut 16 is secured at the top of bushing 14 to lock bushing 14 in place in assembly.

A limit ring 20 is mounted on the lower threaded portion of stem 18 and has a threaded bore 24 in the side of ring 20 adapted to engage a set screw 22. During normal operation and use of the valve 10, limit ring 20 is positioned on stem 18 at a location adapted to prevent upward motion of stem 18 through bushing 14 beyond the point necessary to open the valve to full fluid flow in use. Limit ring 20 is secured in position by tightening set screw 22 on stem 18. If preferred, limit ring 20 can be omitted.

Valve 10 includes a bonnet 26 connected to the valve body by conventional means (not shown on the drawing). Bonnet 26 contains a cylindrical chamber 28 enclosed by the inner wall 30 of bonnet 26. A shoulder 32 is formed in the lower portion of inner wall 30 of bonnet 26. A drive bushing seat 34 is formed in the inner wall 30 of bonnet 26 below shoulder 32.

Bonnet 26 has a plurality of circular threaded bolt holes 38 in spaced relation around the top surface of bonnet 26. A packing gland 40 is mounted on top of bonnet 26 with its lower portion extending downwardly into chamber 28 of bonnet 26. Packing gland 40 has a central opening 42 therethrough adapted to slideably engage stem 18. Packing gland 40 also has a plurality of circular bores 44 therethrough adapted for alignment with the bolt holes 38 in the top of bonnet 26. Packing gland 40 can be secured to the top of bonnet 26 by threaded bolts 46 and nuts 48.

Annular packing means 50 are secured around stem 18 within chamber 28 of bonnet 26 with the top portion of packing means 50 contiguous to the bottom surface of packing gland 40. Packing means 50 can consist of any suitable packing material such as Grafoil packing rings (manufactured by Union Carbide Corporation), Grafoil ribbon, graphite-impregnated asbestos fiber, wire reinforced packing rings, or other suitable materials.

An annular drive bushing, indicated generally by reference number 52, is slideably mounted on stem 18 within chamber 28 of bonnet 26 below packing means 50. Drive bushing 52 can be constructed of any suitable rigid material and preferably of metal that is relatively softer than the metal of bonnet 26. The upper surface 54 of drive bushing 52 is recessed to form a conical portion adapted to engage the bottom portion of packing means 50 in compression. A drive bushing shoulder 56 is formed in the upper portion of drive bushing 52 and is adapted to engage the drive bushing seat 34 formed in the inner wall 30 of bonnet 26. The lower portion 58 of drive bushing 52 is of reduced diameter adapted to slideably engage the lower portion 36 of reduced diameter in chamber 28 of bonnet 26. A stem collar 62 is mounted on stem 18 and displaced from the bottom surface 60 of drive bushing 52. Stem collar 62 can be integral with stem 18 or, alternatively, can be fixedly secured to stem 18.

When valve 10 is in use, the valve assembly is tightly secured with the packing means 50 in compression imposed by tightening nuts 48 on bolts 46 against packing gland 40. The bottom portion of packing means 50 is compressed against the upper recessed surface 54 of drive bushing 52 with the drive bushing shoulder 56 resting on the seat 34. Valve stem 18 is positioned so that, in the full open flow condition, stem collar 62 is displaced from the bottom portion 60 of drive bushing 52 and limit ring 20 is substantially contiguous to the bottom of threaded bushing 14 in yoke 12 to prevent further upward rotation of valve stem 18.

Use of the apparatus of this invention to remove the packing means 50 from valve 10 can be explained by reference to FIG. 2. Set screw 22 is loosened or removed to permit limit ring 20 to slide freely on stem 18. Nuts 48 are removed from bolts 46 and packing land 40 is moved upwardly along stem 18 and fastened to yoke 12 by a flexible wire 64 or other suitable means. Stem 18 is rotated in a counterclockwise direction to raise stem collar 62 into forceable engagement with drive bushing 52. Continued application of upward force by rotation of stem 18 forces the packing means 50 upwardly and out of chamber 28 of bonnet 26. If necessary to free the packing means initially, stem 18 can be rotated rapidly in alternate clockwise directions to bring stem collar 62 into repeated, forceable engagement with drive bushing 52 to free packing material 50. For repacking the valve 10, stem 18 is rotated in a clockwise direction to lower stem collar 62 and drive bushing 52 to their normal positions in the lower portion of chamber 28 of bonnet 26.

As shown in FIGS. 1 and 2, the internal diameters of the surfaces of chamber 28 in bonnet 26, and the dimensions of the lateral surfaces of drive bushing 52, are constructed and arranged to provide suitable clearance between the lateral surfaces of drive bushing 52 and the inner surfaces of chamber 28 to avoid scratching or damaging the inner surfaces of chamber 28 while effectively removing the packing means 50.

Figure 4:
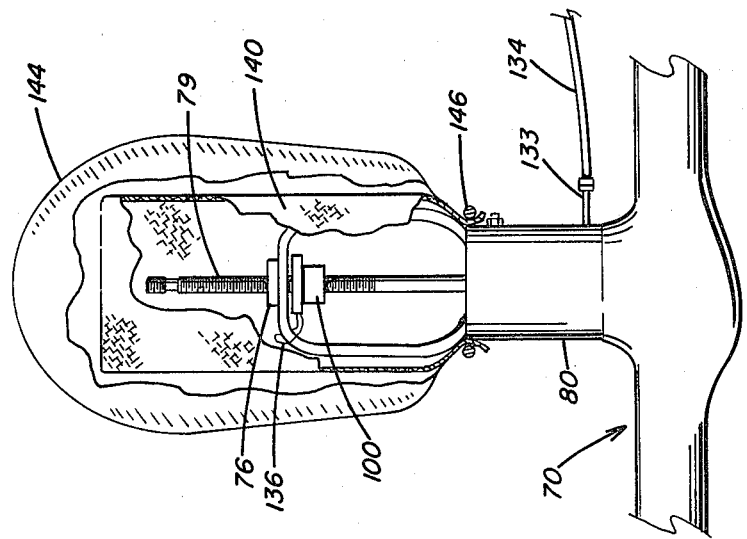
FIG. 4 is a side elevation view of a back seating valve incorporating the fluid pressure actuated packing removal assembly of the subject invention, with portions shown in cross-section for clarity, and showing the valve assembly adapted for removal of the valve packing from the bonnet.
Figure 3:
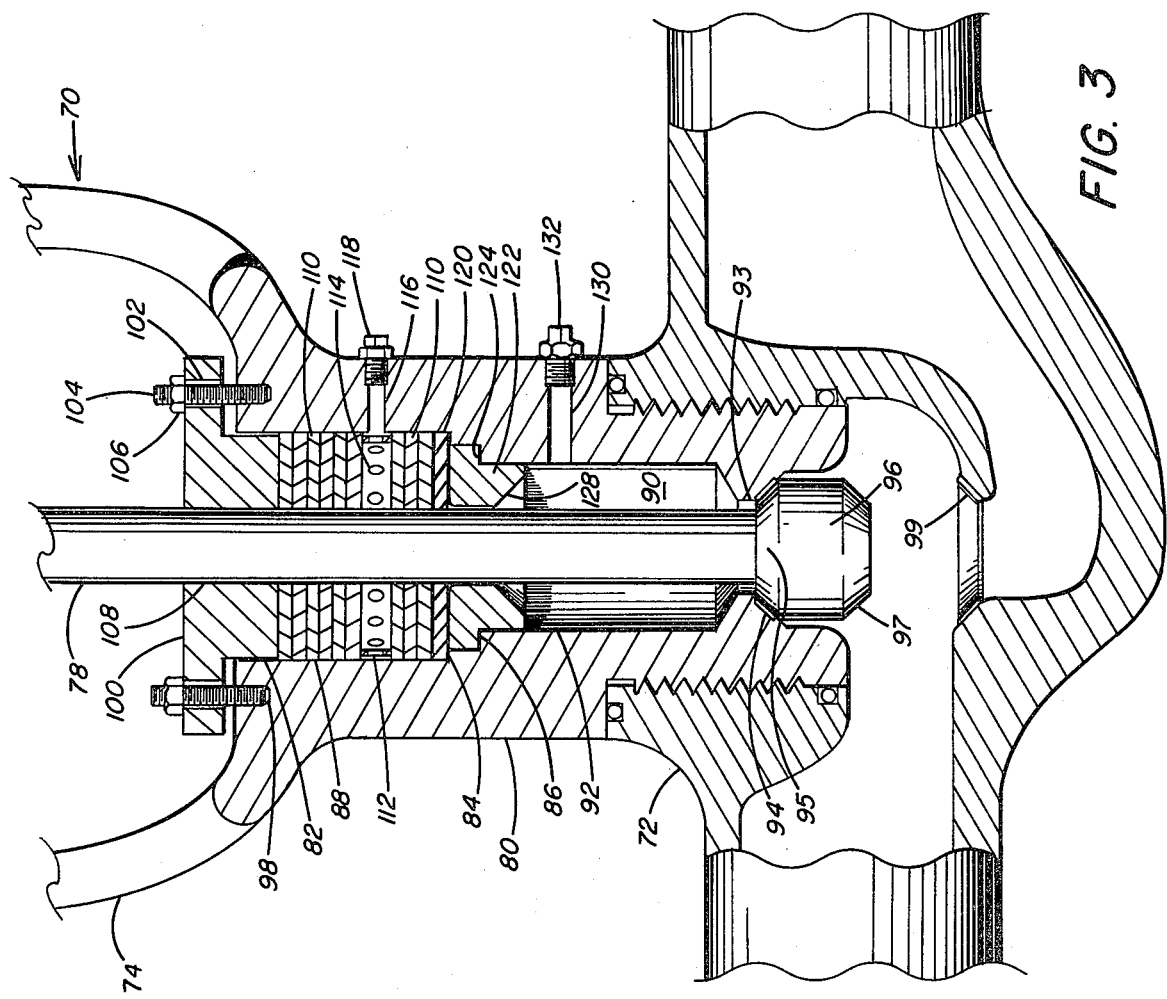
FIG. 3 is a slide elevation view of a back seating valve incorporating the packing removal assembly of the subject invention adapted for fluid actuation of the packing removal assembly, with portions of said view shown in cross-section for clarity.

FIGS. 3 and 4 illustrate another embodiment of the valve apparatus of this invention showing a back seating valve wherein the apparatus is constructed and arranged for fluid pressure actuation of the drive bushing. Referring to FIGS. 3 and 4, there is shown a back seating valve indicated generally by reference numeral 70 having a valve body 72 threadably connected to a valve bonnet 80. A yoke 74 extends upwardly from the upper portion of bonnet 80 and a yoke bushing 76 is threadably secured in the top of yoke 74. A valve stem 78, having an upper threaded portion 79, is rotatably secured in yoke bushing 76 and extends downwardly through yoke 74 and bonnet 80.

Bonnet 80 has an inner cylindrical chamber 82 extending longitudinally therethrough and formed by the inner wall 88 of bonnet 80. A shoulder 84 is formed in a lower portion of inner wall 88 of bonnet 80. A drive bushing seat 86 is formed in the inner wall 88 of bonnet 80 below shoulder 84.

A fluid expansion chamber 90 is formed below bonnet chamber 82 by a lower portion of the bonnet 80 inner wall surface 92, having a reduced diameter. At the bottom of expansion chamber 90, the inner surface of bonnet 80 converges to form a throat 93. Below throat 93, the inner surface of bonnet 80 has a diverging portion forming a ball seat 94 adapted to engage the upper portion 95 of valve ball 96 secured on the bottom of stem 78. Valve ball 96 can be integral with the bottom of stem 78 or, alternatively, can be secured on the bottom of stem 78 by threads or other suitable means. Valve ball 96 has a converging portion 97 formed in the lower end thereof and adapted to engage a ball seat 99 formed in the lower interior wall of valve body 72. Ball seat 99 is adapted to engage the lower converging portion 97 of of valve ball 96 in fluid tight engagement when the valve is in the fully closed condition.

Bonnet 80 has a plurality of threaded bore holes 98 in the top surface thereof. A packing gland 100 is mounted on the top of bonnet 80 and extends downwardly into the upper portion of chamber 82. Packing gland 100 has a plurality of bore holes 102 therethrough constructed and arranged for alignment with the threaded bore holes 98 in the top of bonnet 80. Packing gland 100 is secured at the top of bonnet 80 by bolts 104 and nuts 106. Packing gland 100 has a central opening 108 therethrough to permit passage of stem 78 through packing gland 100.

Packing means 110 are secured in chamber 82 of bonnet 80 around stem 78 and comprise a plurality of packing elements which can consist of any suitable packing material such as Grafoil packing rings, Grafoil ribbon, graphite-impregnated asbestos fiber, wire reenforced packing rings, or other suitable material.

A lantern ring 112 is secured within chamber 82 around stem 78 between upper and lower portions of packing means 110. Lantern ring 112 has a plurality of radial conduits 114 extending inwardly from the outer circumference of lantern ring 112, which is mounted in chamber 82 with the radial conduits 114 aligned with a lubrication port 116 extending through the wall of bonnet 80 into chamber 82. Lubrication port 116 is threaded at its outer end for engagement with a lubrication plug 118.

An annular junk ring 120, constructed of metal or other suitable rigid material, is mounted around stem 78 in chamber 82 contiguous to the bottom of packing means 110 and resting on shoulder 84 in chamber 82. An annular drive bushing 122, mounted around stem 78 in chamber 82 has a shoulder 124 formed in the upper portion thereof and adapted to engage seat 86 in chamber 82, with the top of drive bushing 122 contiguous to the bottom of junk ring 120. The bottom surface 128 of drive bushing 122 converges inwardly toward the center, and upwardly toward the top, of drive bushing 122 to provide greater surface area to increase the upward force imposed on drive bushing 122 by fluid pressure exerted within expansion chamber 90.

A drive fluid port 130 extends through the wall of bonnet 80 into expansion chamber 90 and has a threaded portion at the outer end of drive fluid port 130 adapted to engage a plug 132 threadably secured in drive fluid port 130.

FIG. 4 shows the apparatus of this invention in a back seat valve constructed and arranged for removal of the packing means 110. In FIG. 4, plug 132 has been removed from drive fluid port 130 which is now connected by any suitable connecting means 133 to a hose 134 or other suitable flexible fluid conduit means. At its other end, hose 134 is connected to a pressurized reservoir of drive fluid (not shown in the drawing) which can be a reservoir of any suitable drive fluid such as air, nitrogen, hydraulic fluid, water, or other suitable fluid. The choice of drive fluid, and the choice of suitable pressure applied to the drive fluid, is determined by the operating conditions in which the valve is used and by the condition of the packing means 110.

Nuts 106 have been removed from bolts 104 and packing gland 100 has been raised upwardly along stem 78 and secured to yoke 74 by a wire 136 or other suitable connecting means.

A wire cage 140 is mounted on the valve assembly surrounding the top portion of the valve assembly. Wire cage 140 is secured to bonnet 80 by ring 146 or other suitable means. Wire cage 140 can be constructed of wire mesh or other suitable mesh material having predetermined mechanical strength and mesh size adapted to permit the passage of the drive fluid therethrough while preventing the passage therethrough of particles of predetermined size of packing means 110 or other particulate material. An outer fluid bag 144 surrounds the upper valve assembly and the wire cage 140 and is connected at its lower end by ring 146, or other suitable connecting means, to the upper end of bonnet 80. Fluid bag 144 can be constructed of any suitable fluid impermeable material providing sufficient strength and volume to contain the drive fluid and other materials displaced from the valve assembly during removal of the packing means 110. In a preferred embodiment of this invention, fluid bag 144 can be constructed of rubber or plastic.

In removing the packing means 110 from a back seat valve incorporating the apparatus of this invention, the valve is set in the fully open condition as shown in FIG. 3. In that condition, the upper portion 95 of valve ball 96 is seated against the diverging wall 94 of bonnet 80, thereby limiting further upward movement of stem 78 and providing a fluid tight seal at the bottom of expansion chamber 90. After packing gland 100 has been removed as shown in FIG. 4, the drive fluid is introduced through hose 134 and port 130 into expansion chamber 90 at a pressure sufficient to move drive bushing 122 upwardly against the bottom of junk ring 120 and thereby displace the packing means 110 and lantern ring 112 exteriorally from chamber 82 of bonnet 80.

Because of the relatively small volume of expansion chamber 90 and because of the increased surface area of the bottom surface 128 of drive bushing 122, removal of packing means 110 will normally require a relatively small quantity of drive fluid. Wire cage 140 retains substantially all of the solid or particulate matter displaced from the valve assembly to protect personnel and equipment in the area and fluid bag 144 contains the drive fluid and smaller size particulate matter to further protect personnel and equipment in the area. The valve assembly of this invention as shown in FIGS. 3 and 4 can be used to remove packing from the valve while the valve is connected in line. In such circumstances it might be desirable in particular circumstances to seal off the valve assembly, up-stream and down-stream from the valve, from the rest of the line.

The valve assembly shown in FIGS. 3 and 4 can be used to displace the packing means from the valve by the application of a continuous, pressurized stream of drive fluid to the valve assembly, or by the intermittent application of bursts of drive fluid to the valve assembly.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. In a valve including a valve body having a flow chamber with a valve seat therein and a closure member to move in said flow chamber relative to said seat, the combination comprising,
   a yoke supported by said valve body,
   a bonnet having a packing chamber supported by said valve body,
   a valve stem extending from said yoke through said packing chamber into said flow chamber for supporting said closure member,
   stem drive means supported by said yoke and spaced from said bonnet for displacing said valve stem in the direction of its length along said packing chamber,
   a packing gland detachably mounted and directly connected to the bonnet for slideably receiving said stem with a lower portion of said packing gland extending into said packing chamber for holding packing therein,
   said packing circumposed about an intermediate portion of said stem within said packing chamber below said lower portion of said packing gland, and
   packing removal means circumposed about said stem below said packing, said packing removal means including a drive ring adapted to engage a bottom portion of said packing, said packing removal means further including a collar member on said valve stem in said flow chamber to engage said drive ring independently of said closure member for displacing said packing from said packing chamber externally of said bonnet, said packing removal means applying an upwardly directed force to said packing by operation of said stem drive means after detachment of said packing gland from said bonnet.

2. A valve as described in claim 1 which includes,
   limit means slideably circumposed about a portion of said stem,
   said limit means adapted to be selectively fixedly secured to said stem at a position adapted to prevent further outward movement of said stem past a preselected point in response to operation of said stem drive means.

3. A valve as set forth in claim 2, wherein,
   said limit means is positioned about said stem between said yoke and said packing gland to contact said yoke and prevent further outward movement of said stem,
   and said packing removal means are adapted to engage a bottom portion of said packing and displace said packing exteriorly from said bonnet upon retraction of said stem after detachment of said packing gland from said bonnet and after release of said limit means from fixation on said stem.

4. In a valve as set forth in claim 1, wherein,
   said packing removal means are constructed to guide said stem in its passage through said packing chamber.

5. A valve as set forth in claim 1 wherein said drive ring comprises,
   an annular drive bushing slideably mounted on said stem and having an outwardly extending circumferential shoulder formed on an upper portion thereof, and wherein said collar member comprises,
   a stem collar fixedly secured around the circumference of said stem and spaced from the bottom of said drive bushings during normal operation of the valve, and wherein said bonnet further includes,
   a bonnet shoulder extending inwardly into said packing chamber and adapted to engage said shoulder of said annular drive bushing.

6. A valve comprising:
   a yoke,
   a valve stem extending through said yoke,
   a bonnet through which said stem is guided,
   said bonnet having a chamber through which said stem extends,
   a packing gland detachably mounted on the bonnet and slideably mounted around said stem with a lower portion of said packing gland extending into said chamber,
   packing means circumposed about an intermediate portion of said stem within said chamber below said lower portion of said packing gland,
   drive means circumposed about said stem below said packing means, said drive means adapted to engage a bottom portion of said packing means and displace said packing means exteriorly from said bonnet upon the application to the bottom of said drive means of an upwardly directed force after detachment of said packing gland from said bonnet, and
   limit means slideably circumposed about a portion of said stem, said limit means adapted to be selectively fixedly secured to said stem at a position adapted to prevent further outward movement of said stem past a preselected point in response to displacement of said stem in the direction of its length.

7. A valve as set forth in claim 6, wherein, said limit means are positioned about said stem between said yoke and said packing gland, at a position adapted to cause said limit means to contact said yoke and thereby prevent further outward movement of said stem, and wherein said drive means are adapted to engage a bottom portion of said packing means and displace said packing means exteriorly from said bonnet upon retraction of said stem after detachment of said packing gland from said bonnet and after release of said limit means from fixation on said stem.

8. A valve as set forth in claim 6, wherein said drive means are constructed and arranged within said chamber to guide said stem in its passage through said chamber.

* * * * *